United States Patent [19]

Dunchock

[11] Patent Number: 5,529,271
[45] Date of Patent: Jun. 25, 1996

[54] REVERSIBLE MOUNT FOR A TELEPHONE

[76] Inventor: Richard Dunchock, 535 S. Coast Hwy., Unit 59, Laguna Beach, Calif. 92651

[21] Appl. No.: 359,398

[22] Filed: Dec. 20, 1994

[51] Int. Cl.⁶ .................................................. A44B 13/00
[52] U.S. Cl. ...................... 248/205.2; 224/483; 224/545; 224/901; 248/309.1
[58] Field of Search .................................... 224/483, 545, 224/555, 560, 567, 901; 379/454, 455, 450, 449, 446; 248/205.2, 205.1, 220.2, 221.3, 309.1

[56] References Cited

U.S. PATENT DOCUMENTS

| | | | |
|---|---|---|---|
| 4,472,606 | 9/1984 | Krolopp et al. | 248/221.3 X |
| 4,771,927 | 9/1988 | Ventura | 379/446 X |
| 5,026,016 | 6/1991 | Lisowski | 248/221.3 X |
| 5,069,407 | 12/1991 | Williams | 248/221.3 |
| 5,150,406 | 9/1992 | Dunchock | 379/454 X |
| 5,348,347 | 9/1994 | Shink | 379/446 X |
| 5,392,350 | 2/1995 | Swanson | 379/454 X |

FOREIGN PATENT DOCUMENTS 381436  8/1990  European Pat. Off. ............... 379/454

*Primary Examiner*—Ramon O. Ramirez
*Attorney, Agent, or Firm*—Hawes & Fischer

[57] ABSTRACT

A bracket mounting system encompasses both an apparatus and method enabling the mounting of a portable cellular phone in a manner which provides safety and utility to the user. The bracket system includes a bracket support which is attached to a vehicle dash or console from a pivoting hinge. The bracket support of the bracket system can reversibly engage the pivoting hinge to present either a first surface or a second surface to the driver. The first surface of the bracket support has a strike plate and some other engagement structure to facilitate the wear resistant mounting, removal, and re-mounting of a portable cellular phone. The second surface has a Velcro-type material, preferably of hook members, which engage a complementary surface of hook members which may be attached to a portable cellular phone.

22 Claims, 5 Drawing Sheets

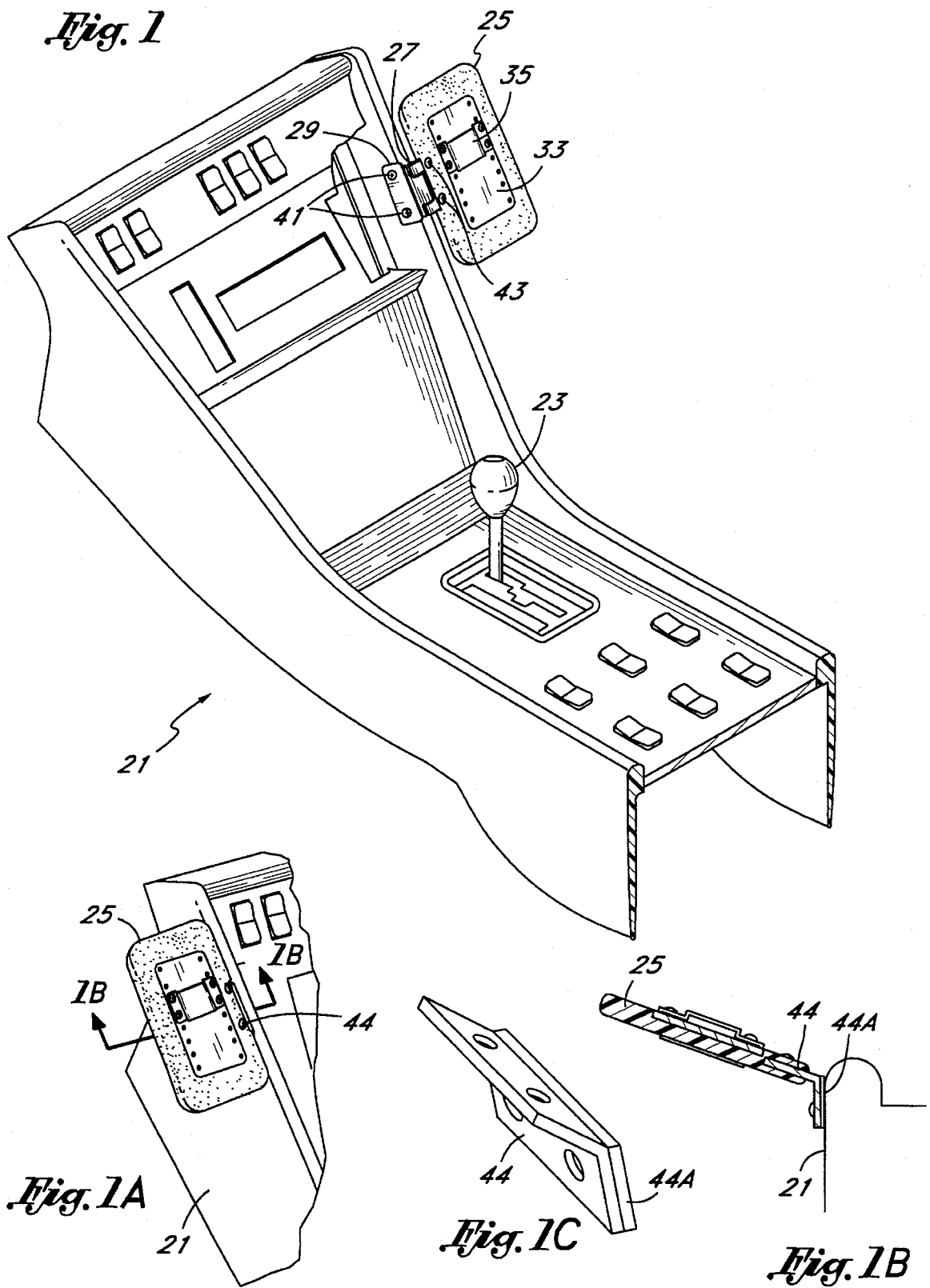

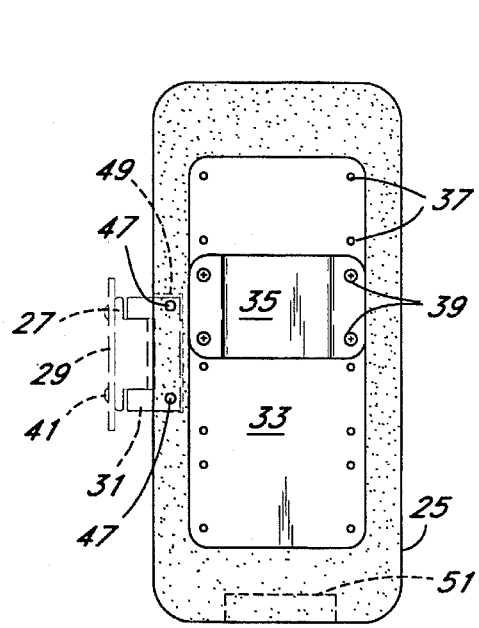 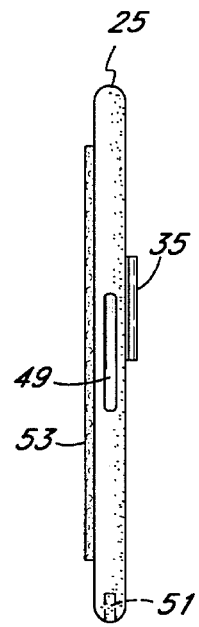 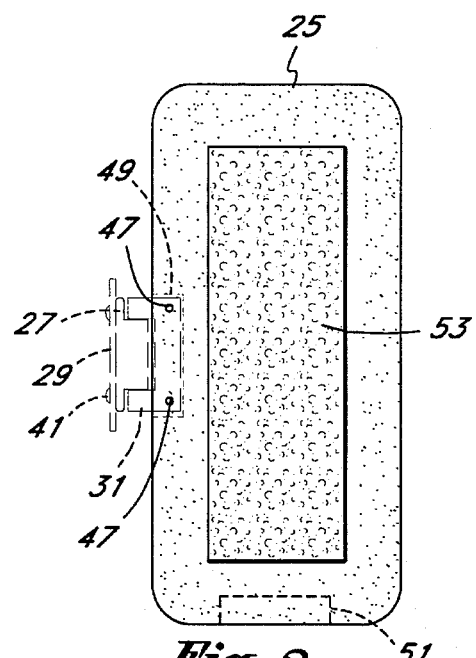 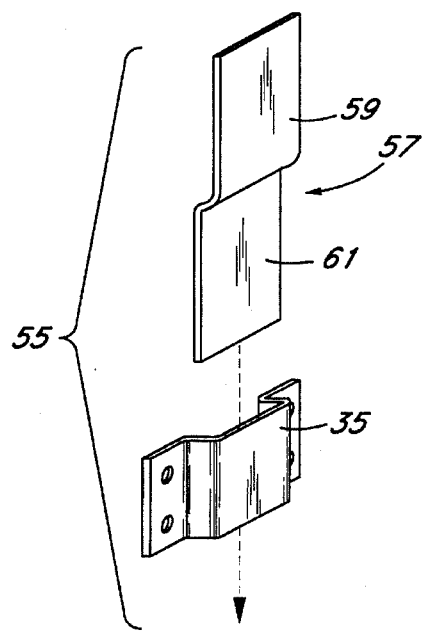 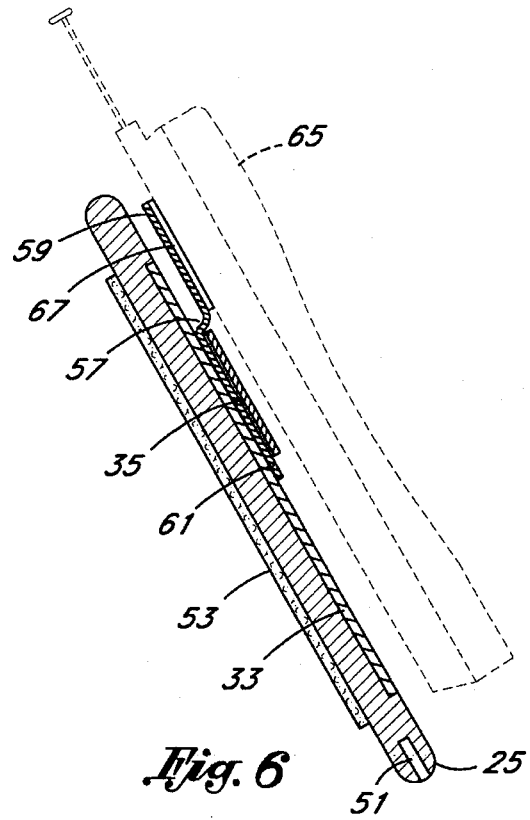

REVERSIBLE MOUNT FOR A TELEPHONE

FIELD OF THE INVENTION

The present invention relates to the field of support structures used to mount equipment, and, more specifically, to a reversible structure especially adapted for use inside a vehicle which can provide support and easy access to equipment, such as cellular telephone equipment.

BACKGROUND OF THE INVENTION

Cellular equipment for use in vehicles has become increasingly popular over the past decade. Original cellular equipment was bulky with distributed control, usually having the transceiver in a trunk mount configuration, and a specialized remotely located handset and stand mounted on the floorboard and between the seats, on the dashboard, or in some instances from the windshield. As the units have gotten smaller, the transceiver, handset and bracket have been increasingly mounted together on the floor board of the vehicle via a metal pipe stand.

Floorboard mounting is undesirable since it can injure the legs and feet of persons entering the car from one side and moving to the other side, as in the case of one side of the car being blocked or when children enter the vehicle. Even in usual situations, adults may snag clothing or be injured by floor mounted equipment. The floor mounts are typically fixed and inflexible, and thus become a serious hazard during sudden stops or collisions. Therefore such mounting is not desirable.

As cellular telephones have continued to improve, it is common today to use small portable phones. Some of the commercially available portable phones are small enough to be placed in the shirt pocket, but the average size of a cellular phone is about six to ten inches tall, from about one to two inches deep and about two to three and a half inches wide. It is unusual to have both a mobile installed cellular phone and a portable cellular phone simultaneously, as a portable cellular phone will perform adequately within a vehicle.

However, for portable cellular phones, using them while driving can be difficult. Usually they lay on the seat, or may be mounted in a brief case or carry bag. If no other place is provided to carry the portable cellular phone, these places may well be where the cellular phone will reside during travel.

If a call is received while the portable cellular phone is in a bag or brief case, the user may not be in a position while driving to answer the call. Where the portable cellular phone is on the seat or nearby the driver, the driver must still take his eyes off the road or begin "feeling around" for the portable cellular phone in an attempt to locate it. When located, the portable cellular phone must still be manipulated to a position where the buttons may be pushed to answer the call. This period may seem short, but if it occurs during a tense driving moment, an accident will very likely result.

The unsecured mounting of the portable cellular phone allows it to be thrown from the seat in a sudden stop. The driver may instinctively reach to secure the portable cellular phone during such an episode. This not only means the driver's eyes are off the road, but may cause a sudden rotation of the steering wheel, and result in an accident.

Floor mounted stands can help to solve the location and access problem, but is most undesirable due both to the injuries set forth above, as well as the necessity to put holes in the floor board of the vehicle with metal screws and the resulting unsightliness which occurs if and when the stand is removed.

Other types of mounting may include directly mounting to the dash board, but such mounting may depend upon the configuration of the dash board or instrument panel available and how it will mate with and interact with the mounting bracket. In addition, such mountings typically are not amenable to removal of the mounting structure where the user either quits using the portable cellular phone, or desires to remove it from the vehicle for any period of time.

In addition, most commonly available brackets not only fail to facilitate removal in a manner which leaves the interior of the vehicle in an acceptable condition, most also do not enable support for anything more than the exact structures for which the brackets were designed. The liquid crystal display readout on the portable cellular phones of today are optimally readable based upon their angle with respect to the driver. If the angle of the portable cellular phone isn't within an acceptable range, the readout will be unreadable due to angle, or due to glare or other reflection. Having the driver move to a contorted position to read the display can add to the safety problems discussed above.

What is therefore needed is a bracket which facilitates the mounting, display, access and availability of a portable cellular phone. The bracket should be amenable for use in both left and right hand drive vehicles, and permit free adjustment of the portable cellular phone to enable maximal readout of the display. Further, the bracket and bracket system should enable alternative methods of mounting to truly become a universal type bracket. Not all portable cellular phones have a housing shape which adapts to a single type of mounting method. Alternatives should be available on the bracket and bracket system desired to provide such flexibility based not only upon the configuration of the housing of the phone, but also based upon the desires of the user.

SUMMARY OF THE INVENTION

The bracket mounting system of the present invention encompasses both an apparatus and method enabling the mounting of a portable cellular phone in a manner which provides safety and utility to the user. The bracket system is attached to a vehicle dash or console, by any acceptable means. The manner of attachment may involve a pivoting hinge or an attachment bracket having a fixed angle. In the case of a pivoting hinge, the main bracket support of the bracket system can reversibly engage the pivoting hinge to present either a first surface or a second surface to the driver. In the case of a fixed mounting method, the bracket support of the present invention can still be reversed with respect to such support. The first surface of the bracket support has a strike plate and some other engagement structure to facilitate the wear resistant mounting, removal, and remounting of a portable cellular phone. The second surface has a Velcro-type material, preferably of loop members, which engage a complementary surface of hook members which may be attached to a portable cellular phone. Thus the user is freed to choose the type of mounting desired. Further, since the bracket support is reversible with respect to the hinge, a single shape of hinge can be used to mount the bracket support to either side of a vehicle console.

BRIEF DESCRIPTION OF THE DRAWINGS

The invention, its configuration, construction, and operation will be best further described in the following detailed description, taken in conjunction with the accompanying drawings in which:

FIG. 1 is a perspective view of a vehicle console illustrating a first embodiment of the bracket system of the present invention supported by an angularly adjustable hinge visible due to a partial cutting away of the surface of the dash adjacent the fixed portion of the hinge;

FIG. 1A is a perspective view of a vehicle console illustrating the bracket system of the present invention supported by a fixed angle hinge;

FIG. 1B a cross sectional view of the hinge of FIG. 1A taken long line 1B—1B;

FIG. 1C is perspective view of the hinge of FIGS. 1A and 1B;

FIG. 2 is a view of the first side of the bracket shown in FIG. 1 and illustrating a strike plate and bracket;

FIG. 3 is a view of the second side of the bracket shown in FIGS. 1 and 2 and illustrating an area of loop members;

FIG. 4 a side view of the bracket shown in FIGS. 1–3;

FIG. 5 illustrates a male and female bracket set of the first embodiment shown in FIGS. 1–4;

FIG. 6 illustrates a side sectional view showing the engagement of the bracket set of the first embodiment and with respect to a portable cellular phone;

DETAILED DESCRIPTION OF THE PREFERRED EMBODIMENT

Figure 7:
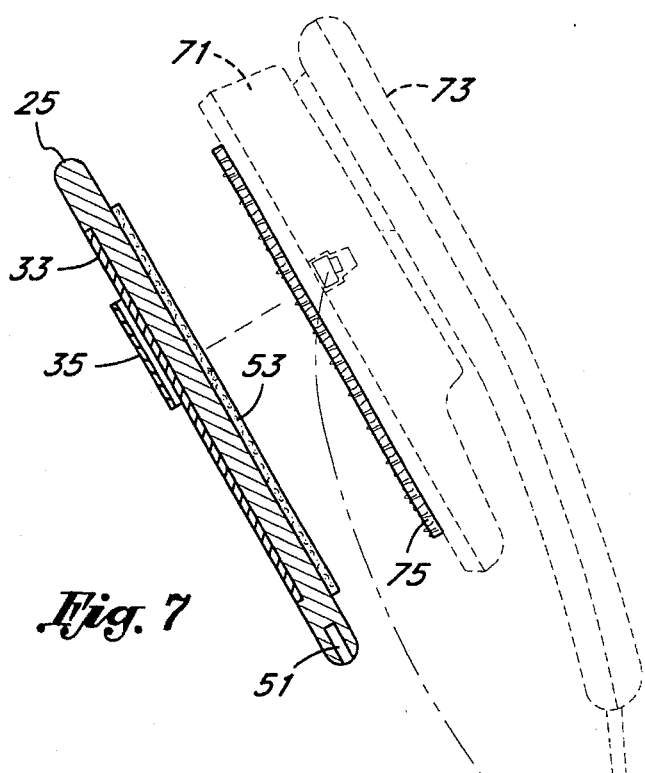
FIG. 7 is a side view of the first embodiment of the bracket system shown in FIGS. 1–6 and illustrating the use of the hook members in conjunction with a portable cellular phone base and handset assembly.

The description and operation of the invention will be best described with reference to FIG. 1. FIG. 1 shows a console 21. The console may or may not be fitted with a transmission selector 23, or other utility structures. A bracket support 25 is supported by a hinge 27. Hinge 27 has a vehicle hinge bracket 29 attached to console 21 and a support hinge bracket 31 (not visible in FIG. 1) fitted within bracket support 25.

Shown facing the viewer is the first side of bracket support 25 which supports a strike plate 33 and a female bracket 35. Referring to FIG. 2, a close-up view of the bracket support 25 illustrates, in phantom, the extension of the support hinge bracket 31 into the bracket support 25, and illustrates the vehicle hinge bracket 29 shown in a position relative to the bracket support 25.

As can be seen, the strike plate 33 has a series of mounting apertures 37, and four of such mounting apertures 37 are engaged by screws 39 engaging the female bracket 35 to both the strike plate 33 and the bracket support 25. It is understood that a variety of techniques may be used to attach the female bracket 35 to the bracket support 25, including and not limited to welding, adhesive attachment, tab and slot engagement on forming, riveting, and a variety of other attachment techniques too numerous to adequately explore in detail here. The use of screws at multiple positions is used for explanation since this method affords the user the opportunity to select quantum placement of the female bracket 35. It is understood that the use of an adhesive would permit placement of the female bracket along the bracket support 25 at any position, and preferably over the strike plate 33. Referring back to FIG. 1, a pair of screws 41 engage the vehicle hinge bracket 29 to the console 21. A pair of screws 43 are shown which engage the bracket support 25 to the support hinge bracket 31.

Referring to FIG. 1A, bracket support 25 is shown at the other side of the console 21 and attached to console 21 by an angled bracket which will be referred to hereafter as a fixed angle hinge 44. Although it does not hingeably angularly displace bracket support 25, it is given this name to emphasize the use of any structure to support the bracket support 25, whether or not moveable, is an acceptable structure. Referring to FIG. 1B, a sectional view taken along line 1B—1B of FIG. 1A illustrates the relationship between the fixed angle hinge 44 and the console 21. Referring to FIG. 1C, a perspective view of the hinge 44 is shown which illustrates the relatively simple nature of the structure which can be employed to support the bracket support 25.

Also shown is a end portion of double stick tape 44A or other adhesive which can be used to attach hinge 44 to the console 21. Also shown in FIG. 1B is the employment of screws or bolts in addition to the double stick tape 44A. Of course, double stick tape 44A may be solely used to secure the hinge 44 to the console 21, or other means may be used. A liquid adhesive may also be used, and may occupy the volume indicated by FIG. 1B and act as the sole agent for holding the hinge 44 to the console 21.

The holes into which screws 41 and 43 fit are more clearly shown in FIG. 2. The vehicle hinge bracket 29 has a pair of apertures 45 to accommodate screws 41, while the support hinge bracket 31 has a pair of apertures 47 to accommodate screws 43.

The support hinge bracket 31 extends into the bracket support 25 accommodated by a first slot 49, shown in dashed line format. Bracket support 25 has a second slot 51 shown along the underside and set out in dashed line format. The presence of two slots 49, 51 will enable the bracket support 25 to be mounted in either of a vertically oblong or horizontally oblong position. Alternatively, the bracket support 25 may be square or substantially square in which case a single slot 49 would be used.

Referring to FIG. 3, a view of a second side of the bracket support 25 is shown which is partially or fully covered by an area of Velcro-type loop members 53. Of course, hook members could be used, but it is expected that greater utility and flexibility can be obtained by using loop members on the bracket support 25. Referring to FIG. 4, a side view of the bracket support 25 illustrates the relationship of the slots 49 and 51 as well as the relative height of the loop members 53 and the female bracket 35.

Referring to FIG. 5, a male and female bracket set 55 includes the female bracket 35 shown in FIGS. 1—4, but also shows one configuration of a male bracket 57. Although any number of different types of male brackets could interfit with the female bracket 35, the male bracket 7 shown is comprised of an upper planar portion 59 which is offset but parallel to a lower planar portion 61. The male bracket 57 is preferably made from a single piece of material which is sharply angled about its midpoint. In the configuration shown, the upper planar portion 59 would be affixed to a portable cellular phone while the lower planar portion would be fittable into the female bracket 35 in a manner shown by the dashed line.

Note that the male bracket 57 may be turned over its horizontal axis and that the upper planar portion 59 and the lower planar portion 61 will have switched position. Referring to FIG. 6, the completed mounting arrangement with respect to bracket support 25 is shown.

A portable cellular phone 65 is shown in phantom. To the rear face of the cellular phone 65 a thickness of adhesive 67 attaches the body of cellular phone 65 to the upper planar portion 59 of the male bracket 57. The lower portion 61 of the male bracket 57 is secured between the strike plate 33 and the inside surface of the female bracket 35. Therefore to remove the cellular phone 65, the cellular phone 65 need only be grasped and slid upwardly.

The advantages of the configuration shown in FIG. 6 include ease of handling, safety, prevention of the cellular phone 65 from falling off of the bracket support, even under the most severe movement of the vehicle in which the cellular phone 65 is mounted.

Other configurations, both with respect to brackets and cellular phones are accommodated by the bracket support 25. Referring to FIG. 7, the bracket support 25 is oriented such that the loop members 53 face toward the user and are used to support equipment. A non-portable cellular phone having a base 71 and a handset 73 is fitted with an area of hook members 75. The hook members 75 engage the area of loop members 53 supported on the second side of the bracket support 25. In this configuration, the strike plate 33 and female bracket are oriented away from the user.

Figure 8:
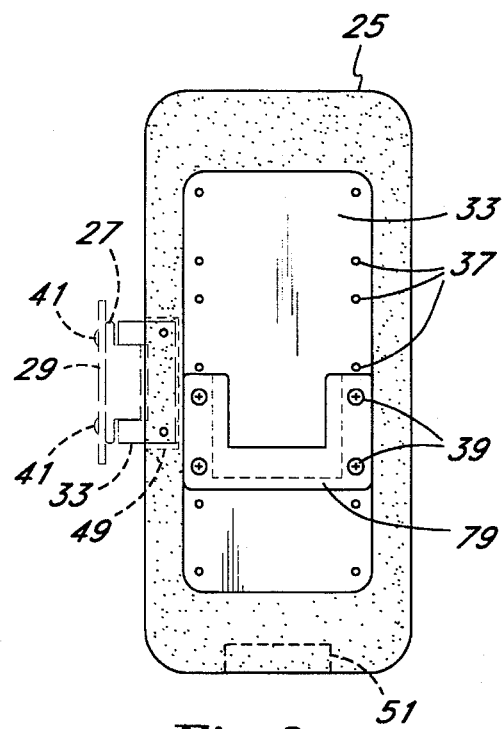
FIG. 8 is a view of a first side of a second embodiment of the bracket system of the present invention.
Figure 9:
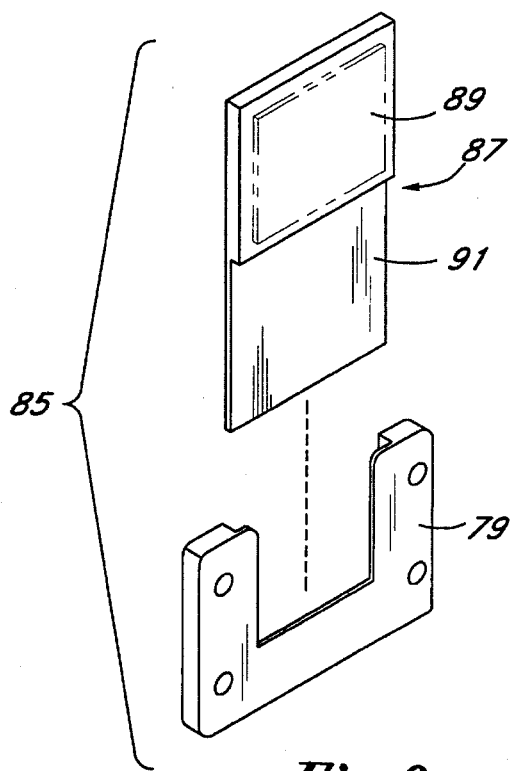
FIG. 9 illustrates a male and female bracket set of the second embodiment shown in FIG. 8.
Figure 10:
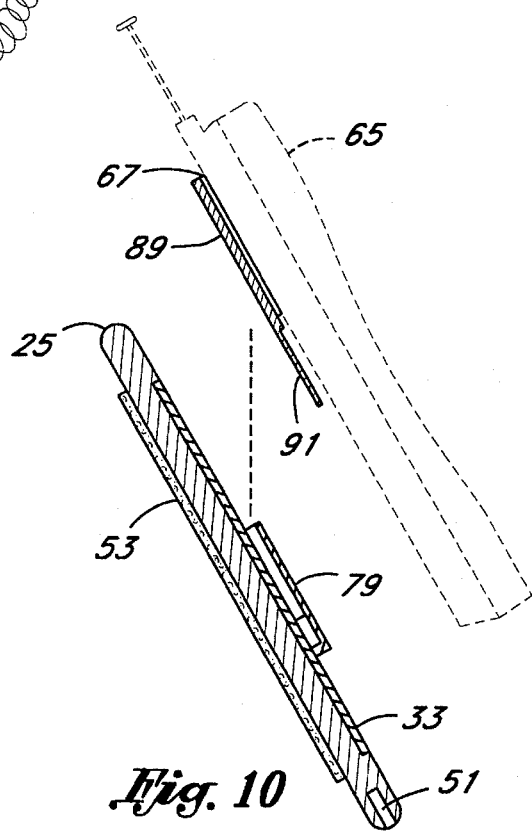
FIG. 10 illustrates a side sectional view showing the engagement of the bracket set of the second embodiment and with respect to a portable cellular phone.

A second embodiment of bracket is shown with respect to FIGS. 8–10. Again shown is the bracket support 25 and strike plate 33. These structures now support a female bracket 79 which has a U-shape. The overall U-shape is incidental to the areas which will support a male bracket. The face of the female bracket 79 facing the strike plate 33 defines a slot 81 which will accept a male member into the upper end thereof. Since the male member will be significantly wider than the U-shaped open portion of the female bracket, it is the dimensions of the slot 81 which defines the fit.

Referring to FIG. 9, a male and female bracket set 85 includes the female bracket 79 shown in FIG. 8, but also shows one configuration of a male bracket 87. Although any number of different types of male brackets could interfit with the female bracket 79, the male bracket 87 shown is comprised of an upper planar portion 89 which has a thickness significantly thicker than a lower planar portion 91. The male bracket 87 is preferably made from a single piece of material in which the transition from the upper planar portion to the lower planar portion is an abrupt right angle. A sloping angle may tend to jam if the lower planar portion 91 is to short to act as a stop with respect to female bracket 79.

In the configuration shown, the upper planar portion 89 would be affixed to a portable cellular phone while the lower planar portion 91 would be fittable into the female bracket 79 in a manner shown by the dashed line. Referring to FIG. 10, the completed mounting arrangement with respect to bracket support 25 is shown.

Again, the portable cellular phone 65 is shown in phantom. To the rear face of the cellular phone 65 a thickness of adhesive 67 attaches the body of cellular phone 65 to the upper planar portion 89 of the male bracket 87. The lower portion 91 of the male bracket 87 is secured between the strike plate 33 and the inside surface of the slot 81 of female bracket 79. Therefore to remove the cellular phone 65, the cellular phone 65 need only be grasped and slid upwardly.

The advantages of the configuration shown in FIGS. 8–10 include ease of handling, safety, prevention of the cellular phone 65 from falling off of the bracket support, even under the most severe movement of the vehicle in which the cellular phone 65 is mounted.

Figure 11:
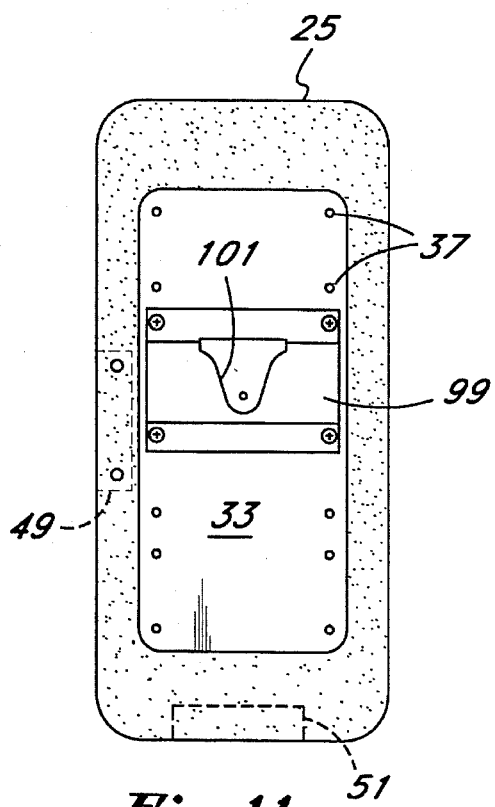
FIG. 11 is a view of a first side of a third embodiment of the bracket system of the present invention.
Figure 12:
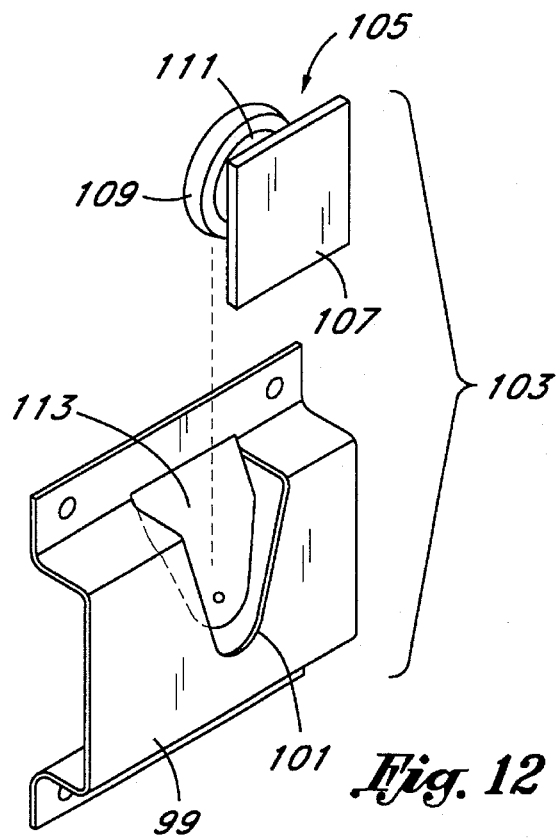
FIG. 12 illustrates a male and female bracket set of the second third shown in FIG. 11.
Figure 13:
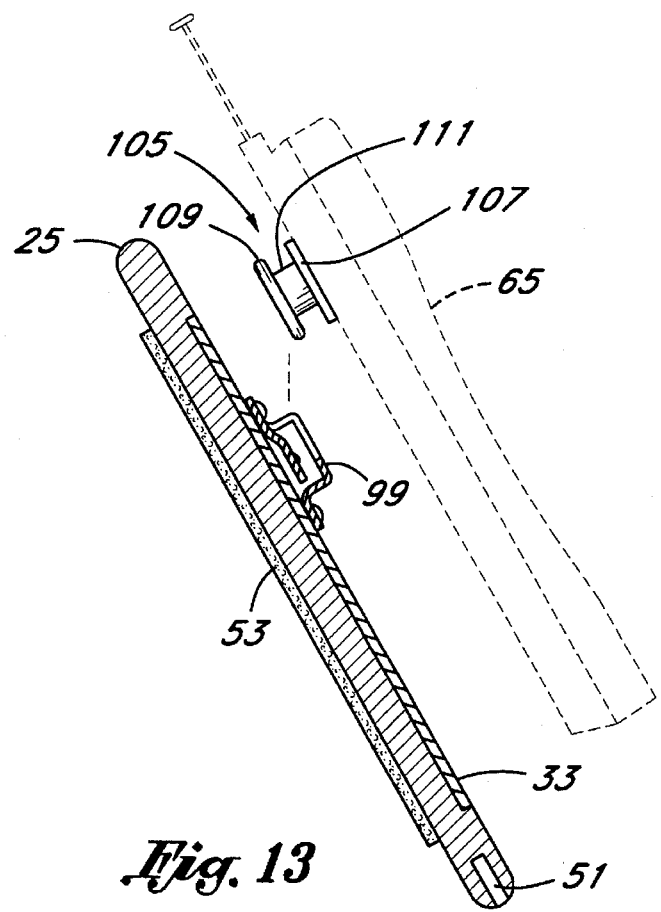
FIG. 13 illustrates a side sectional view showing the engagement of the bracket set of the third embodiment and with respect to a portable cellular phone.

A third embodiment of bracket is shown with respect to FIGS. 11–13. Again shown is the bracket support 25 and strike plate 33. These structures now support a female bracket 99 which defines a horizontal opening into which a portion of the bracket is formed into a spring structure as will be shown. Since the bracket 99 covers the width of the strike plate, the width of a open U-shaped opening 101 may vary.

Referring to FIG. 12, a male and female bracket set 103 includes the female bracket 99 shown in FIG. 11, but also shows one configuration of a male bracket 105. Although any number of different types of male brackets could interfit with the female bracket 99, the male bracket 105 shown is comprised of a planar base portion 107, a button portion 109, and a connector portion 111 connecting the button portion 109 to the planar portion 107. The male bracket 105, due to the rounded shape of the button portion 109 enables the male bracket 105 to pivot with respect to the female bracket 99.

The female bracket 99 is preferably formed of a single piece of material and a spring portion 113 is partially punched from the main body of material of the female bracket 99 and left at an angle, angling toward the main body of the bracket 99. This spring portion 113 will be displaced to accommodate the button 109 into the u-shaped opening between the rear surface of the U-shaped opening 101 and the surface of the spring portion 113.

The male bracket 105 is preferably made from a single piece of material in which the transition from the bottom portion to the connector portion 111 is a radially continuous right angle. The lower apex portion of the U-shaped opening 101 should have a radius matching that of the connector 111. The combination of this radius match and the action of the spring portion 113 will help hold the male bracket 105 securely in place with respect to the female bracket 99.

Referring to FIG. 13, a side sectional view of the embodiment of FIGS. 11 and 12 is shown. Again, the portable cellular phone 65 is shown in phantom. To the rear face of the cellular phone 65, the planar base portion 107 is shown attached to the cellular phone 65. It may be attached by adhesive or other acceptable means, including bolting or threaded attachment. Such threaded attachment would eliminate the planar portion 107 and enable connector portion 107 to directly engage the housing of the cellular phone 65. Again, to remove the cellular phone 65, the cellular phone 65 need only be grasped and slid upwardly.

Figure 14:
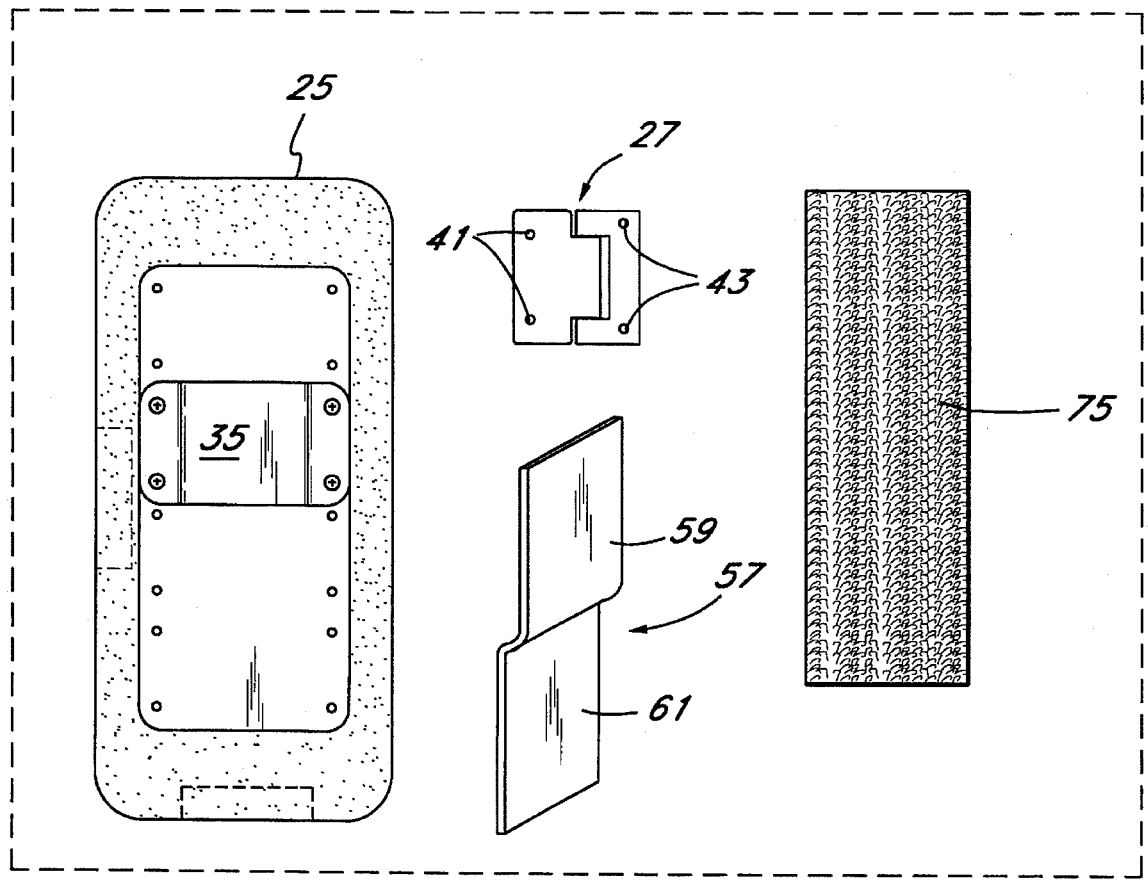
FIG. 14 illustrates a kit containing a bracket support with attached female bracket, male bracket, and an area of hook members.

Referring to FIG. 14, a kit is shown which contains the bracket support 25, hinge 27, male bracket 57, and area of loop members 53. The most basic kit will contain bracket support 25, and male bracket 57. Advanced kits may contain an area of loop members 53, and more advanced and complete kits may include the hinge 27, complete with screws 41 and 43.

While the present invention has been described in terms of a bracket support useful in a vehicle, one skilled in the art will realize that the structure and techniques of the present invention can be applied to many appliances. The present invention may be applied in any situation where good, sturdy support is desired.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A support for a cellular telephone comprising:
   a bracket support, having a first side, a second side and defining a continuous surface between said sides, said continuous surface defining an aperture extending into said support parallel to said first and second sides;
   a strike plate affixed to said first side of said bracket support;
   an area of one of loop and hook members affixed to said second side of said bracket support; and
   a female bracket affixed to said strike plate.

2. The support recited in claim 1 wherein said strike plate has a plurality of threaded apertures and said female bracket has mounting holes in alignment with associated said apertures and further comprising mounting screws engaging said mounting holes with said threaded apertures.

3. The support recited in claim 1 wherein said female bracket defines a main surface in a first plane and wherein said female bracket has a pair of mounting surfaces in a second plane parallel to said first plane, and oppositely disposed with respect to said main surface.

4. The support recited in claim 3 wherein said female bracket is formed from a single piece of material.

5. The support recited in claim 3 wherein said bracket support is vertically oblong and where said female bracket forms a vertically extending open ended aperture with respect to said strike plate.

6. The support recited in claim 3 wherein said female bracket defines a central aperture and a spring member at an angle to one of said mounting surfaces.

7. The support recited in claim 2 wherein said female bracket defines a first slot adjacent said strike plate on a first side of said female bracket, a second slot partially bounding and adjacent said first slot and adjacent a second side of said female bracket.

8. A cellular telephone support kit including the support of claim 1 and further comprising a male bracket interfitting with said female bracket and attachable to a cellular telephone.

9. The cellular telephone support kit of claim 8 further comprising an area of the other of said loop members and said hook members.

10. The kit of claim 8 further comprising a hinge interfittable with the aperture of said support.

11. The kit of claim 10 wherein said support pivots on the hinge along a planar moment of angular displacement about a line parallel to a sides of said support.

12. The kit of claim 8 wherein said male bracket comprising a planar support having a first side being attachable to a cellular telephone and a second side having an extension defining a button from the second side which engages said female bracket.

13. The kit of claim 8 wherein said male bracket comprising a generally rectangular shape having a first portion having a first side in a first plane and a second portion having a first side in a second plane offset from said first plane of said first portion, and wherein the second portion is approximately one half the thickness of said first portion, the second portion to interfit the female bracket when the first side of said first portion is attached to a cellular telephone.

14. The kit of claim 8 wherein male bracket has a first planar surface and a second planar surface parallel to and set apart from said first planar surface.

15. A cellular telephone support including the support of claim 1 wherein said bracket support has an area of loop members and further comprising an area of hook material having a first side attachable to a cellular telephone and a second side and matable with the area of loop members.

16. A support for a cellular telephone comprising:
   a bracket support, having a first side, a second side and defining a continuous surface between said sides;
   a strike plate affixed to said first side of said bracket support having a plurality of threaded apertures;
   an area of loop members affixed to said second side of said support;
   a female bracket having mounting holes;
   mounting screws engaging said mounting holes and threaded apertures, and affixing said female bracket to said strike plate; and
   a hinge attaching to said bracket support such that the bracket support pivots on the hinge along a planar moment of angular displacement about a line parallel to the sides of said support.

17. The support recited in claim 16 wherein the continuous surface of the bracket support defines an aperture extending into said support; and
   wherein the hinge interfits within the aperture of said support.

18. The support recited in claim 16 wherein said female bracket defines a main surface in a first plane and wherein said female bracket has a pair of mounting surfaces in a second plane parallel to said first plane oppositely disposed with respect to said main surface; and
   further comprising a male bracket having a first planar surface and a second planar surface parallel to said main planar surface, the first planar surface to interfit the female bracket when the second planar surface is attached to a cellular telephone.

19. The support recited in claim 16 where the bracket support is vertically oblong and where said female bracket forms a vertically extending open ended aperture with respect to said strike plate; and
   further comprising a male bracket having a planar support being attachable to a cellular telephone on one side and having an essentially central extension from the other side which interfits with said female bracket.

20. The support recited in claim 16 wherein said female bracket defines a main surface in a first plane and wherein said female bracket has a pair of mounting surfaces in a second plane parallel to said first plane oppositely disposed with respect to said main surface; and
   further comprising a male bracket member attached to a cellular telephone, interfitting and pivoting with respect to said female bracket.

21. The support recited in claim 16 where the bracket support is vertically oblong and where said female bracket forms a vertically extending open ended aperture with respect to said strike plate; and further comprising a planar member attached to a cellular telephone interfitting said female bracket.

22. The support recited in claim 16 where the support is used with a vehicle and where the hinge attaches the bracket support to the interior of the vehicle.

* * * * *